July 29, 1930.   N. L. MORTENSEN ET AL   1,771,896
MOTOR CONTROL SYSTEM
Filed May 25, 1928
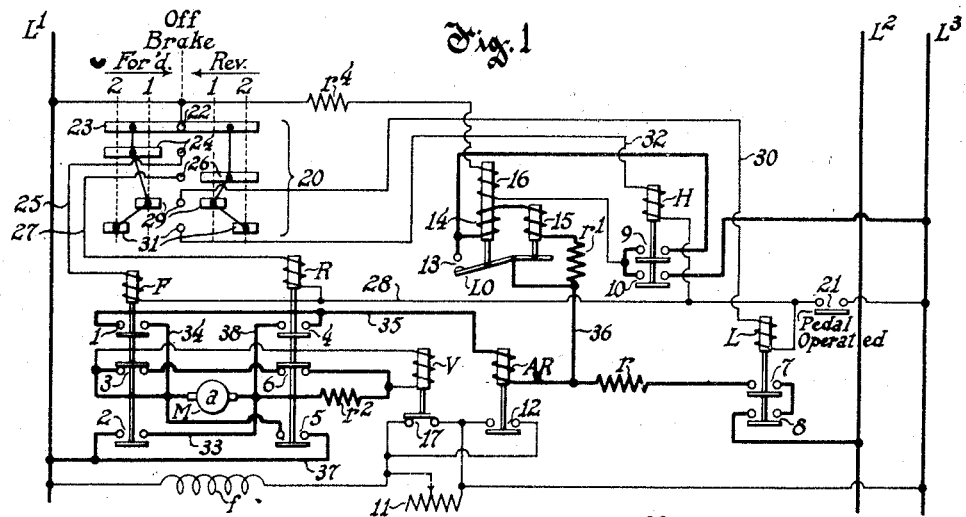
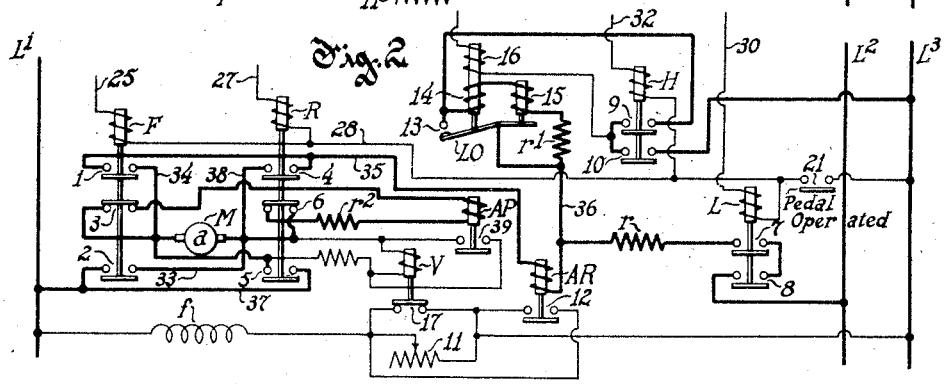
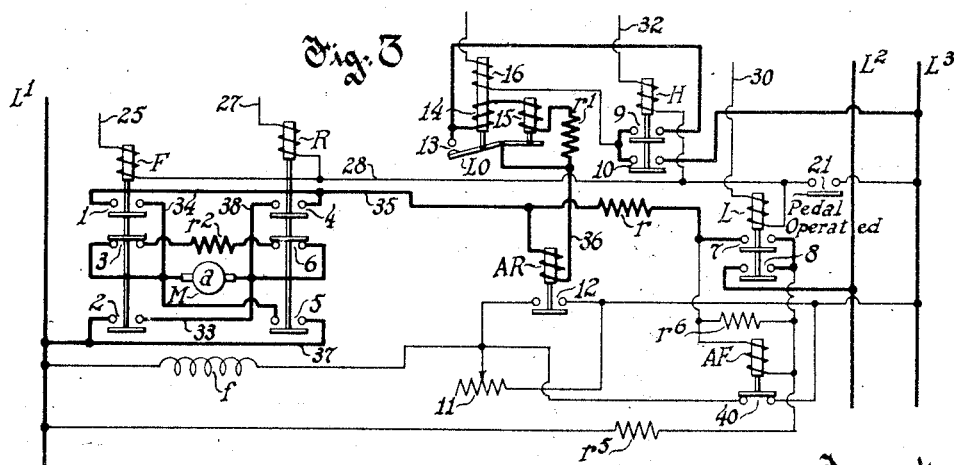
Inventors
Niels L. Mortensen
Carroll Stansbury
By Frank H. Hubbard
Attorney Patented July 29, 1930

1,771,896

UNITED STATES PATENT OFFICE

NIELS L. MORTENSEN, OF MILWAUKEE, AND CARROLL STANSBURY, OF WAUWATOSA, WISCONSIN, ASSIGNORS, BY MESNE ASSIGNMENTS, TO CUTLER-HAMMER, INC., OF MILWAUKEE, WISCONSIN, A CORPORATION OF DELAWARE

MOTOR-CONTROL SYSTEM

Application filed May 25, 1928. Serial No. 280,454.

This invention relates to motor control systems, and is especially applicable to multi-voltage systems, although not limited thereto.

In such systems wherein the motor is subjected to field regulating, difficulties have been experienced as the result of too great a field strength when transferring from one voltage to a lower voltage, and upon initiation of dynamic braking. On the other hand, full field strength is desired both for starting and dynamic braking, and ordinarily the field control must be automatic for acceleration, deceleration and stopping.

The present invention has among its objects to provide a multi-voltage system wherein the control of the motor field is entirely automatic and wherein field weakening may be obtained for transfer from one voltage to a lower voltage and also for initial dynamic braking.

More particularly, the invention has among its objects to provide means which will afford full field strength as desired, but which will insure a sufficiently weakened field at the instant of transfer from one voltage to a lower voltage or establishment of dynamic braking connections, as the case may be, and for a temporary period thereafter, to overcome the difficulties heretofore experienced.

Various other objects and advantages of the invention will hereinafter appear.

The accompanying drawing illustrates diagrammatically certain embodiments of the invention which will now be described, it being understood that the invention is susceptible of other modifications and other applications falling within the scope of the appended claims.

In the drawing

Figure 1 is a diagrammatic view of a controller embodying the invention in one form, and Fig. 2 is a diagrammatic view showing a modification of the controller of Fig. 1, and Fig. 3 is a diagrammatic view showing a further modification of the controller of Fig. 1.

Referring to Fig. 1, there is illustrated a motor M having an armature $a$ and a shunt field $f$, said motor to be supplied with power from a relatively low voltage circuit $L^1 L^2$, or alternatively from a higher voltage circuit $L^1 L^3$. It may be assumed that this motor is employed for drive of a tire building machine and that the circuit $L^1 L^2$ is 115 volts, while the circuit $L^1 L^3$ is 230 volts, these being the customary voltages for such machines.

The controller includes electroresponsive reversing switches F and R, an electroresponsive switch L to connect the motor to the lower voltage circuit through said reversing switches and a resistance $r$, and an electroresponsive switch H to connect the motor to the higher voltage circuit through said reversing switches and a resistance $r^1$. The reversing switch F has main contacts 1 and 2 and normally closed auxiliary contacts 3, while reversing switch R has main contacts 4 and 5 and normally closed auxiliary contacts 6. As will be understood, the main contacts of the reversing switches commutate the motor armature connections for reverse operation thereof, while the normally closed contacts 3 and 6 control a dynamic braking loop across the motor armature inclusive of a braking resistance $r^2$. The switch L is shown as of the double pole type having contacts 7 and 8, and the switch H is shown as of a like type having contacts 9 and 10. While the switches L and H have both poles thereof located at one side of the motor armature it is of course to be understood that each might have its poles on opposite sides of the motor armature.

The motor field is connected across the higher voltage circuit $L^1 L^3$ through an adjustable rheostat 11 having a short-circuit controllable by an accelerating relay AR of the vibrating type having normally open contacts 12 and having its winding in series with the motor armature. Such a relay is a customary provision of the form of controller illustrated, and as will be understood it responds upon completion of the motor circuit to short-circuit the field rheostat, whereas it releases after the motor attains normal speed, to open the short-circuit around the field rheostat, thereafter vibrating until the motor attains full speed.

In the particular controller illustrated no provision is made for accelerating the motor through armature control when connected to the lower voltage circuit, but provision is made for accelerating the motor through armature control prior to acceleration through field control when the motor is connected to the higher voltage circuit. This means is shown as comprising a so-called lockout switch LO having contacts 13, an operating winding 14, a lockout winding 15 and a holding winding 16. The operating and lockout windings 14 and 15 are connected in series with the motor to afford current limit control of the contacts 13 which upon engaging short-circuit resistance $r^1$ together with windings 14 and 15. The winding 16 holds the contacts 13 in engagement, said winding being of the shunt type to be connected across the line through a resistance $r^4$ upon closure of switch H.

The arrangement thus far described, which is well known, provides for the desired acceleration and would afford a weakened field for deceleration but would not insure field strengthening for low voltage operation after transfer or field strengthening for dynamic braking. However, additional field controlling means are provided which together with the foregoing means afford complete and entirely automatic control of the motor field.

Such additional field controlling means comprises a voltage relay V having normally engaged contacts 17 paralleling the contacts 12 of the relay AR to short-circuit the field rheostat 11. The winding of relay V is connected across the motor armature through the resistance $r^2$ and hence is adapted upon acceleration of the motor to a given degree to disengage contacts 17 and to maintain the same disengaged until the motor speed is reduced to a given value. Preferably the relay V is designed and adjusted to respond only when the motor speed is such as to subject the same to approximately 230 volts and to hold the contacts 17 disengaged until the voltage to which it is subjected is reduced to approximately 115 volts.

With the relay V thus adjusted the same would not respond until after transfer of the motor to the higher voltage circuit and hence it would render the relay AR ineffective to weaken the motor field during low voltage operation of the motor. On the other hand, the relay V would respond to disengage the contacts 17 upon acceleration of the motor to normal speed after such transfer. Also the relay V would maintain contacts 17 disengaged upon transfer from the higher voltage circuit to the lower voltage circuit pending deceleration of the motor. Accordingly with the relay AR open the relay V would upon deceleration insure field weakening during transfer of the motor from the higher voltage circuit to the lower voltage circuit and for a temporary period thereafter. However, the relay V would release upon a given deceleration of the motor as previously described, thereby reengaging contacts 17 to short-circuit the field rheostat and hence provide full field strength of the motor for continued low voltage operation.

Further, should the motor be disconnected from circuit and subjected to dynamic braking while operating at a speed sufficient to maintain relay V energized said relay would function as set forth to maintain the contacts 17 disengaged for field weakening for a temporary period. With the connections illustrated release of relay V would be subject to a delay by self-inductance for the winding of said relay is short-circuited by the auxiliary contacts of the reversing switches. On the other hand, relay V would ultimately release contacts 17 to reestablish the short-circuit around the rheostat 11 thereby increasing the motor field strength for continued dynamic braking.

A master switch 20 of usual form is provided for control of the operating windings of the reversing switches F and R and the switches H and L, the windings of said switches having a common connection to line $L^3$ through a switch 21 which may be assumed to be the foot operated switch commonly employed in tire machine control. The circuits controlled by master switch 20 may be traced as follows:

From line $L^1$ to contact 22 and segment 23 to contacts 24 by conductor 25 to the winding of switch F, or alternatively from segment 23 through contacts 26 by conductor 27 to the winding of switch R, both of said windings being connected by conductor 28 through switch 21 to line $L^3$. Also, circuit may be traced from segment 23 of the master switch through contacts 29, certain of which are duplicated, by conductor 30 through the winding of switch L to conductor 28 and thence to line $L^3$, and from segment 23 through contacts 31, certain of which are duplicated, by conductor 32 through the winding of switch H to conductor 28 and thence to line $L^3$.

The motor connections may be traced as follows:

From line $L^1$ through contacts 2 of reversing switch F by conductor 33 through the motor armature from right to left, by conductor 34 through contacts 1 of switch F by conductor 35 through the winding of relay AR and a resistance $r$ through contacts 7 and 8 of switch L to line $L^2$, or alternatively from winding of relay AR by conductor 36 through the resistance $r^1$ and windings 15 and 14 to and through contacts 9 and 10 of switch H to line $L^3$. Alternatively circuit may be traced from line $L^1$ by conductor 37 through contacts 5 of reversing switch R to and through the motor armature from left to right, by conductor 38 through contacts 4 to conductor 35 and thence to line $L^2$ or line $L^3$, as previously traced. The motor field circuit may be traced from line $L^1$ through said field and rheostat 11 or the short-circuit thereof to line $L^3$.

Referring to the modification shown in Fig. 2, the winding of relay V is connected across the motor armature through a resistance and is provided with a normally open short-circuit controlled by contacts 39 of a relay AP having its winding connected in the dynamic braking circuit. With the winding V so connected it remains energized upon establishment of dynamic braking connections until the relay AP responds, and said relay is so designed and adjusted as to respond only after dynamic braking has started. Accordingly the relay V would function to maintain a weakened field strength for a longer period than is provided for by the connections of Fig. 1, and the delay in release of relay V would be slightly augmented by the short-circuit around its winding established by relay AP upon responding. On the other hand, release of relay V is insured after a temporary period to afford full field strength for continued dynamic braking.

Referring to the further modification shown in Fig. 3, a relay AF is provided in lieu of relay V of Fig. 1. Relay AF has normally closed contacts 40 to short-circuit the field rheostat and has its winding so connected as to be responsive to the counter voltage of the motor to effect interruption of the short-circuit around the field rheostat upon acceleration of the motor to a given speed. More particularly, the winding of relay AF has one terminal connected to one side of the motor armature through resistance $r$ assuming closure of either reversing switch and has its other terminal connected through a resistance $r^5$ to $L^1$ and hence to the opposite side of the motor armature assuming closure of either reversing switch. Further, the winding of relay AF has a short-circuit to be completed by contacts 7 of the switch L whereby said relay is rendered unresponsive so long as the motor is connected to the low voltage circuit and whereby de-energization of said relay following transfer of the motor from the higher voltage circuit to the lower voltage circuit is insured. However, the first mentioned connections of said relay insure against release of said relay during such transfer assuming operation of the motor above a given speed and release of said relay is further delayed by its self-inductive action upon short-circuiting of its winding by contacts 7 of switch L.

Thus relay AF provides for maintaining the field strength of the motor upon transfer of the motor from the higher voltage circuit to the lower voltage circuit and said relay has an additional connection for its winding whereby it also functions to delay field weakening upon establishment by dynamic braking connections. More particularly the winding of relay AF has a short-circuit including a resistance $r^6$ and is thus afforded a discharge circuit. Accordingly as will be understood, the relay AF if energized when the motor is disconnected from circuit and subjected to dynamic braking would remain energized for a temporary period to afford the motor an opportunity to slow down prior to field strengthening for continued dynamic braking.

What we claim as new and desire to secure by Letters Patent is:

1. In combination, a motor, supply circuits therefor of different voltages, means to transfer said motor from either circuit to the other, and associated field controlling means for said motor, said field controlling means being operable automatically to effect field weakening for transfer from one of said circuits to another of lower voltage and for a temporary period thereafter, the latter means comprising a relay having a winding subjected to the counter voltage of said motor.

2. In combination, a motor, supply circuits therefor of different voltages, means to transfer said motor from either circuit to the other and automatic field controlling means for said motor to effect field weakening for transfer from one of said circuits to another of lower voltage and for a temporary period thereafter, the latter means comprising a relay biased to effect field strengthening and having an operating winding subjected to the counter voltage of said motor.

3. In combination, a motor, supply circuits therefor of different voltages, automatic field controlling means for said motor including a relay to be set in response to counter voltage of said motor for field weakening thereof and means to connect said motor to said supply circuit selectively or alternatively to disconnect said motor, establish dynamic braking connections therefor and remove said relay from the influence of the counter voltage of said motor for release of said relay, said relay having a discharge circuit for effecting a delay in its release.

4. In combination, a motor, supply circuits therefor of different voltages, means to connect said motor to said circuits selectively, and automatic field controlling means for said motor comprising a relay responsive to the counter voltage of the motor and a relay responsive to the motor current, said relays coacting to provide for field weakening upon acceleration of said motor and on transfer of said motor from one of said circuits to another of lower voltage.

5. In combination, a motor, supply circuits therefor of different voltages, means to connect said motor to said circuits selectively, and automatic field controlling means for said motor comprising a relay responsive to the counter voltage of the motor and a relay responsive to the motor current, said relays coacting to provide for field weakening upon acceleration of said motor and on transfer of said motor from one of said circuits to another of lower voltage, and said first mentined relay providing for field strengthening upon deceleration of said motor following such transfer.

6. In combination, a motor, supply circuits therefor of different voltages, means to connect said motor to said circuits selectively or alternatively to disconnect said motor and establish dynamic braking connections therefor and automatic field controlling means for said motor comprising a relay responsive to counter voltage of said motor and a relay responsive to the motor current, said relays coacting to provide for field weakening on acceleration and under certain speed conditions also providing for field weakening when said motor is transferred from one of said supply circuits to another of lower voltage or when said motor is initially subjected to dynamic braking.

7. In combination, a motor, supply circuits therefor of different voltages, means to connect said motor to said circuits selectively or alternatively to disconnect said motor and establish dynamic braking connections therefor and automatic field controlling means for said motor comprising a relay responsive to counter voltage of said motor and a relay responsive to the motor current, said relays coacting to provide for field weakening on acceleration and under certain speed conditions also providing for field weakening when said motor is transferred from one of said supply circuits to another of lower voltage or when said motor is initially subjected to dynamic braking, said field controlling means further providing for field strengthening through the medium of said first mentioned relay following such transfer of said motor or initiation of dynamic braking.

8. The combination with a motor, of means to connect said motor to a supply sourcse, or alternatively to disconnect said motor from its source of supply and establish dynamic braking connections therefor, and automatic field controlling means for said motor to provide for field strengthening for starting, field weakening for initial dynamic braking and field strengthening for continued dynamic braking, the latter means comprising a relay having a winding subjected to the counter voltage of said motor.

In witness whereof, we have hereunto subscribed our names.

NIELS L. MORTENSEN.
CARROLL STANSBURY.